(12) United States Patent
Shi et al.

(10) Patent No.: US 7,575,772 B2
(45) Date of Patent: Aug. 18, 2009

(54) PROCESS AND COMPOSITION FOR SYRUP AND JAM FROM LUO HAN GUO FRUIT

(75) Inventors: Yuan Shi, Little Neck, NY (US); Yvonne H. Zhang, Farmingdale, NY (US); Michael Peng, Farmingdale, NY (US)

(73) Assignee: Frisun, Inc., Farmingdale, NY (US)

( * ) Notice: Subject to any disclaimer, the term of this patent is extended or adjusted under 35 U.S.C. 154(b) by 213 days.

(21) Appl. No.: 11/533,625

(22) Filed: Sep. 20, 2006

(65) Prior Publication Data

US 2007/0116851 A1 May 24, 2007

Related U.S. Application Data

(63) Continuation-in-part of application No. 11/288,632, filed on Nov. 21, 2005, now abandoned.

(51) Int. Cl.
*A23L 1/236* (2006.01)
*A23L 1/20* (2006.01)

(52) U.S. Cl. .................. 426/548; 426/425; 426/431; 426/478; 426/506; 426/615; 426/655

(58) Field of Classification Search .................. 426/425, 426/431, 478, 506, 548, 615, 655
See application file for complete search history.

(56) References Cited

U.S. PATENT DOCUMENTS

| 5,411,755 | A | 5/1995 | Downton et al. |
| 5,433,965 | A | 7/1995 | Fischer et al. |
| 6,682,766 | B2 | 1/2004 | Blumenstein et al. |
| 2004/0137094 | A1 | 7/2004 | Mower et al. |

OTHER PUBLICATIONS

U.S. Appl. No. 60/968,204, filed Aug. 27, 2007, Shi et al.
U.S. Appl. No. 11/960,826, filed Dec. 20, 2007, Shi et al.
U.S. Appl. No. 12/200,531, filed Aug. 28, 2008, Shi et al.
PCT International Preliminary Report on Patentability for Newayceutical, Inc., International App'l No. PCT/US2006/045144, filed Nov. 21, 2006, Dated Jun. 5, 2008.
Konoshima, T. et al., "Anti-Carcinogenic Activities of Natural Sweeteners" Foods and Food Ingredients Journal of Japan, vol. 208, No. 3, 2003.
Song, F. et al., "A natural sweetener, *Momordica grosvenori*, attenuates the imbalance of cellular immune functions in alloxan-induced diabetic mice" Phytotherapy Research, vol. 20, Issue 7, Jul. 2006, p. 552-560.
Song, F. et al., "Effect of *Momordica grosvenori* on oxidative stress pathways in renal mitochondria of normal and alloxan-induced diabetic mice" European Journal of Nutrition, vol. 46, No. 2, Mar. 2007, p. 61-69.
Takeo, E, et al., "Sweet elements of *Siraitia grosvenori* inhibit oxidative modification of low-density lipoprotein" Journal of Atherosclerosis and Thrombosis, vol. 9 (2002), No. 2, p. 114-120.
Qi, X. et al., "Effect of a *Siraitia grosvenori* extract containing mogrosides on the cellular immune system of type 1 diabetes mellitus mice" Molecular Nutrition & Food Research, vol. 50, Issue 8, p. 732-738.
Qin, X. et al., "Subchronic 90-day oral (Gavage) toxicity study of a Luo Han Guo mogroside extract in dogs" Food and Chemical Toxicology, vol. 44, Issue 12, Dec. 2006, p. 2106-2109.
Suzuki et al., "Triterpene glycosides of *Siraitia grosvenori* inhibit rat intestinal maltase and suppress the rise in blood glucose level after a single oral administration of maltose in rats" Journal of Agricultural and Food Chemistry, 2005, 53(8), pp. 2941-2946.
Forte—A World of Health!, New Vision, May 23, 2008, http://www.newvision.com/dept-forte.asp.
Forte—A remarkable super juice featuring the amazing acai berry, New Vision, May 23, 2008, http://www.newvision.com/content.asp?page_id=569.
Luo Han Guo Drink, Nutshell, May 23, 2008, http://pelfnyok.blogspot.com/2005/11/luo-han-guo-drink.html.
Nutrition Advisor—Eat any sugar alcohols lately?, Yale-New Haven Hospital, May 23, 2008, http://ynhh.org/online/nutrition/advisor/sugar_alcohol.html.
Sugar Alcohols Fact Sheet, International Food Information Council, Sep. 2004.
Sweet & Slender® Natural Sweetener, Wisdom Natural Brands, Apr. 4, 2006, http://wisdomnaturalbrands.com/products/sweetandslender/index.htm.
Sweet & Slender® FAQ, Wisdom Natural Brands, Apr. 4, 2006.
Lakanto Natural Sweetener for Diabetics and Full-Scale Dieters, Saraya, May 23, 2008, http://www.export-saraya.com/lakanto/index.html.
Konoshima, T. et al., 2003, "Anti-Carcinogenic Activities of Natural Sweeteners", Foods and Food Ingredients Journal of Japan, vol. 208(3): 184-191. (w/English Translation).
Takasaki, M. et al., "Anticarcinogenic activity of natural sweeteners, cucurbitane glycosides, from *Momordica grosvenori*." Cancer Letters, vol. 198, Issue 1, Jul. 30, 2003, p. 37-42.
Song, F. et al., "A natural sweetener, *Momordica grosvenori*, attenuates the imbalance of cellular immune functions in alloxan-induced diabetic mice" Phytotherapy Research, vol. 20, Issue 7, Jul. 2006, p. 552-560 (Abstract Only).
Konoshima, T. et al., "Anti-Carcinogenic Activities of Natural Sweeteners" Foods and Food Ingredients Journal of Japan, vol. 208, No. 3, 2003, (Abstract Only).
Song, F. et al., "Effect of *Momordica grosvenori* on oxidative stress pathways in renal mitochondria of normal and alloxan-induced diabetic mice" European Journal of Nutrition, vol. 46, No. 2, Mar. 2007, p. 61-69, (Abstract Only).

(Continued)

*Primary Examiner*—Leslie Wong
(74) *Attorney, Agent, or Firm*—Law Offices of Albert Wai-Kit Chan, PLLC

(57) ABSTRACT

The present invention provides a Luo Han Guo whole fruit extract prepared by a process that includes extracting the peel and pulp of Luo Han Guo fruits by boiling water. The resulting whole fruit extract can be formulated into a sugar-free, low calorie, low glycemic index syrup or jam comprising the Luo Han Guo whole fruit extract and sugar alcohols (polyols).

6 Claims, 1 Drawing Sheet

OTHER PUBLICATIONS

Takeo. E, et al., "Sweet elements of *Siraitia grosvenori* inhibit oxidative modification of low-density lipoprotein" Journal of Atherosclerosis and Thrombosis, vol. 9 (2002), No. 2, p. 114-120, (Abstract Only).

Qi, X. et al., "Effect of a *Siraitia grosvenori* extract containing mogrosides on the cellular immune system of type 1 diabetes mellitus mice" Molecular Nutrition & Food Research, vol. 50, Issue 8, p. 732-738, (Abstract Only).

Qin, X. et al., "Subchronic 90-day oral (Gavage) toxicity study of a Luo Han Guo mogroside extract in dogs" Food and Chemical Toxicology, vol. 44, Issue 12, Dec. 2006, p. 2106-2109, (Abstract Only), Feb. 2007.

Yasushi, A. et al., "Triterpene glycosides of *Siraitia grosvenori* inhibit rat intestinal maltase and suppress the rise in blood glucose level after a single oral administration of maltose in rats" Journal of Agricultural and Food Chemistry, 2005, 53(8), pp. 2941-2946, (Abstract Only).

*Siraitia grosvenorii*, Jun. 12, 2007, http://en.wikipedia.org/wiki/Luo_Han_Guo.

PROCESS AND COMPOSITION FOR SYRUP AND JAM FROM LUO HAN GUO FRUIT

CROSS-REFERENCE TO RELATED APPLICATIONS

This is a continuation-in-part application of U.S. Ser. No. 11/288,632, filed Nov. 21, 2005, now abandoned, the disclosure of which is hereby incorporated by reference.

FIELD OF THE INVENTION

This invention relates to preparation of stabilized syrup and jam from whole Luo Han Guo fruit of the Curcubitaceae family.

BACKGROUND OF THE INVENTION

Nowadays consumers are becoming more and more health conscious, and are ever mindful of what they eat and their overall carbohydrate intake. Many people try to avoid high consumption of refined sugar, thus creating a huge demand for an alternative—a natural sweetener. The growth of the sweetener market has redefined what traditionally constitutes a sweetener, encouraged innovative usages of such sweetener in functional products, and developed customized sweetener for focused use and optimal benefits.

Sugar (sucrose) is a carbohydrate that consists of two simple sugars, fructose and sucrose. Sucrose, or disaccharide, derives from sugar cane/beet root, whereas fructose, a monosaccharide, is found in fruit, vegetable and honey. High fructose corn syrup is very popular at present because of the premium profile of sweetness that fructose offers. However, high fructose corn syrup contains an almost equal combination of fructose and glucose that might contribute to the growing epidemic of obesity.

Alternative sweetener such as SACCHARIN, which is derived from a constituent of grapes and petroleum, has a low production cost and a highly intensified sweetness level. However it was banned by FDA because a Canadian study confirmed that the widely used artificial sweetener causes cancer in test animals.

Acesulfame potassium is made from acetoacetic acid and potassium, and it blends well with other sweetener. SUCRALOSE is marketed by the brand name of SPLENDA, and it is a chlorocarbon chemical that contains three atoms of chlorine in every molecule. Another sweetener such as ASPARTAME is made from amino acids and phenylalanine.

Stevia is a natural sweetener that comes from a plant in the daisy family called Stevia rebaudiana. Stevia is sold as a dietary supplement only because the FDA contends that there is not enough data to regard Stevia as safe for food consumption.

Recently Agave, a succulent plant that belongs to the Agavaceae family, emerges in the natural sweetener market in the form of agave syrup or agave nectar. Agave syrup composes of 90 percent fructose and 10 percent glucose.

Luo Han Guo (Siraitia grosvenori or Momordica grosvenori) is the fruit of the plant Siraitia grosvenorii in the Curcubitaceae family. The fruit is well known for its sweetness. The sweet taste of Luo Han Guo comes from a group of terpene glycosides called mogrosides. Mogroside is different from carbohydrates and does not have the disadvantages of carbohydrates. The mogrosides have been numbered I to V with the main component being mogroside-V. The mixed mogrosides are estimated to be about 300 times as sweet as sugar by weight.

Luo Han Guo fruits are grown in the mountain areas of southern China where the warmth of southern China along with shades provided by the mountains created a perfect environment for Luo Han Guo growth. Most of these areas in southern China are also recognized as having a higher life expectancy. Some studies attributed this to the consumption of Luo Han Guo, while others claim the longevity is the result of the local's tranquil lifestyle, simple diet and regular exercise. Regardless of the explanations, the locals at southern China had recognized the benefits of Luo Han Guo hundreds of years ago. They had been using it as a medicinal herb that treats coughing and sore throat, promotes respiratory health, enhances immune function, maintains vitality as well as detoxifies.

The Encyclopedia of Traditional Chinese Medicine (Jiangsu New Medical College, 1977) recommends using dried Luo Han Guo fruits as a remedy for respiratory complaints such as dry coughs, and it can be used as a laxative as well. The book "Fruit as Medicine," (Dai and Liu, 1986) reported that Luo Han Guo fruits are used as a remedy for heat stroke with thirst, acute and chronic throat inflammation, aphonia, chronic cough, constipation due to aging, and as a sugar substitute for diabetics. The Luo Han Guo, "chongji", is reported to be a popular treatment for colds in China. Recent studies on Luo Han Guo included investigation of the antioxidant activity of mogrosides and their potential use as cancer prevention agents. It is generally understood that antioxidants may lead to significant reversal or suppression in the early stage of cancer development. Furthermore, Luo Han Guo and its sweetening component are often mentioned in relation to diabetes and obesity because it can be used as a substitute for caloric sugars that are normally consumed in the diet.

Mogrosides are non-caloric sweeteners that have a low glycemic index (approximately 20; while the index for sugar is 70). Luo Han Guo natural sweetener has the texture and taste of sugar, and it is a natural sweetener, not a supplement. There are no reported incidents of negative side effects of Luo Han Guo. The American Food and Drug Administration classifies Luo Han Guo as a generally recognized as safe product, thus there are no restrictions on consuming the fruit or its extracts.

In view of the benefits of Luo Han Guo, it is highly desirable to bring all the advantages of Luo Han Guo together to meet today's market demand for a natural, sugar-free sweetener. Most sugar-free syrup on the market today uses sugar alcohols and artificial sugar substitute to sweeten their products. Unfortunately, the taste of these sugar-free products is often not very pleasant. On the other hand, traditional syrups, e.g. maple or corn syrup, contain a high level of sugar that is not suitable for people who want to avoid high glycemic level and calorie count.

SUMMARY OF THE INVENTION

The present invention provides a process for producing syrup and jam with a natural flavor from Luo Han Guo whole fruit extract. The syrup and jam produced according to the method disclosed herein contain natural components from Luo Han Guo.

In one embodiment, the present invention provides a method of preparing whole fruit extract from Luo Han Guo fruits. Extract from the peel and pulp of Luo Han Guo fruits is obtained by a method comprising boiling the fruits in water, thereby obtaining an extracted liquid containing solid components of the fruits. The solid components of the fruits are then separated from the extracted liquid, wherein the extracted liquid contains extract of the peel and pulp of the Luo Han Guo fruits.

In another embodiment, the present invention provides syrups or jams derived from the Luo Han Guo whole fruit extract prepared as described herein. These syrups or jams are sugar-free, low in calorie, low in glycemic index, have an unaltered Luo Han Guo natural taste, and may further contain other components such as sugar alcohols. These syrups or jams comprising the Luo Han Guo whole fruit extract would be attractive to diabetics and people who worry about their calorie and sugar intake.

It is also an object of this invention to produce syrup and jam that are low in calorie and glycemic index with diabetic therapeutic function.

DETAILED DESCRIPTION OF THE INVENTION

Figure 1A:
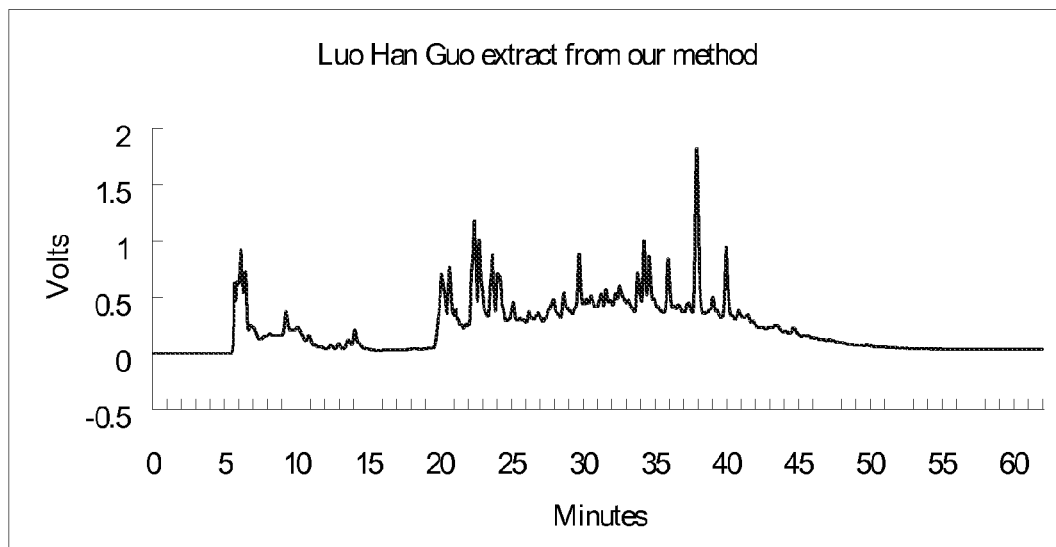
FIG. 1A shows a HPLC profile of Luo Han Guo whole fruit extract prepared according to the method disclosed herein. The HPLC conditions are: C18 column, 300 Å, 5 uM, 4.6 mm ID×250 mmL, flow rate 0.5 mL/min. Solvent A: 0.1% TFA/Water; solvent B: 0.1% TFA/Acetonitrile. 2-62 min, solvent A, 100% -40%, solvent B, 0%-60%.

The present invention provides a method of preparing whole fruit extract from Luo Han Guo fruits. Extract from the peel and pulp of Luo Han Guo fruits is obtained by a method comprising (i) cleaning the fruits; (ii) breaking the outer shell or peel of the fruits; (iii) boiling the fruits in water, thereby obtaining an extracted liquid containing solid components of the fruits; and (iv) separating the solid components of the fruits from the extracted liquid, wherein the extracted liquid contains extracts of the peel and pulp of the fruits.

In general, the Luo Han Guo fruits are boiled for about 1 to 2 hours. The extracted liquid containing solid components of the fruits can be further acidified to about pH 4.0-5.0 with an edible acid before digesting with pectinase to remove pectin. The pectinase enzyme is then denatured by heating after the digestion. Preferably, the final extracted liquid without the solid components of the fruits is further concentrated before formulating the extract into syrup or jam.

In another embodiment, there is provided a sugar-free syrup comprising the Luo Han Guo whole fruit extract prepared according to the method described herein. The syrup can further comprise sugar alcohol. Representative sugar alcohols include, but are not limited to, sorbitol, mannitol, xylitol, maltitol, maltitol syrup, lactitol, erythritol, isomalt, and hydrogenated starch hydrolysates.

In yet another embodiment, there is provided a sugar-free jam comprising the Luo Han Guo whole fruit extract prepared according to the method described herein. This sugar-free jam may further comprise sugar alcohol and pectin.

The invention being generally described, will be more readily understood by reference to the following examples which are included merely for purposes of illustration of certain aspects and embodiments of the present invention, and are not intended to limit the invention.

EXAMPLE 1

Method of Obtaining Luo Han Guo Whole Fruit Extract

The present example describes a method of obtaining whole fruit extract from Luo Han Guo. The steps of the process are described below.

Select Luo Han Guo Fruit

It is a very important initial step. Luo Han Guo fruits are selected on a conveyor belt. Any mature fruit carry a green color should be excluded. Fresh and ripe fruits are picked, while decayed, molded or insect damaged fruits are removed and discarded. Under ripe Luo Han Guo fruits are discarded also because they tend to taste bitter. The purpose of the selection process is to ensure a good quality of the product.

Cleaning Procedure

Luo Han Guo fruits are cleaned in a moving water bath equipped with air agitator. The water bath has two compartments: the first compartment is for initial wash, whereas the second compartment is for further washing. The fruits are moved through the two compartments by the force of moving water propelled by air agitation from below. The fruits are thoroughly washed to remove all adhering dirt. The washing water should not contain disinfectant solutions, detergents or chlorine.

Cracking Open the Luo Han Guo Fruits

The outer peel (shell) of the Luo Han Guo fruits is gently broken by a mashing apparatus, or any other processing technology generally available in the art. Luo Han Guo fruits contain a large amount of seeds, and it is important to not smash the seeds because it would cause a bitter flavor in the final product. The extraction is based on peel and pulp, not including any seed.

Whole Fruit Extraction

The cracked Luo Han Guo fruits are put into boiling water for 1 to 2 hours in a container. Through this process, water will extract components from the peel and pulp of Luo Han Guo fruits. No chemical is involved during the extraction.

Enzyme Digestion

Luo Han Guo fruits contain a large amount of pectin. Pectin is not stable when the product is in storage. It will dilute the final product or cause layers. Pectinase digestion is conditioned for 1 hour at the temperature of 45° C., preferably between 37-50° C., and the pH is adjusted by citric acid solution. The final product should have a pH lower than 5, preferably between 4-5, more preferably between 4.2-4.5. Pectinase is then added to the mixture of the extracted liquid, fast mixed for 5 minutes, and the extract is digested with continuous agitation.

Stabilization

At this point, the extracted liquid still contains active pectinase, and possibly enzymes and bacteria as well. These contaminants will negatively affect the stability and the shelf life of the final product. These enzymes and bacteria may be denatured and eliminated from the extracted liquid and solid by boiling the extracted liquid for about 0.5-1 hour.

Separation of Liquid and Solid

After enzyme digestion, the extracted liquid and solid are separated through a draining process that drains off liquid from the container.

Filtration

The extracted liquid will still contain small pieces of Luo Han Guo fruit material after the separation process. Therefore, a filtration process is needed. The solids (peel and pulp) are processed by high speed centrifugation to recover extracted liquid trapped with the solid components. Then all the extracted liquid is combined and filtered by different mesh filters in order to remove small particles. This filtration step would also prevent bacterial growth during the process.

Final Extract

Figure 1B:
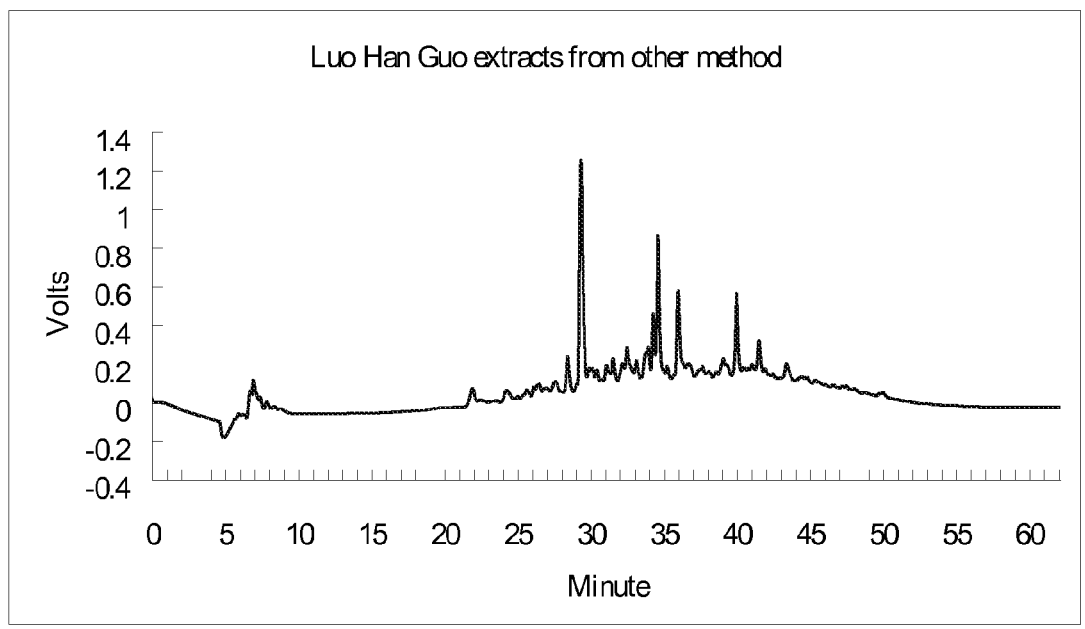
FIG. 1B shows a HPLC profile of Luo Han Guo extract prepared according to method described by other investigators. The HPLC conditions are: C18 column, 300 Å, 5 uM, 4.6 mm ID×250 mmL, flow rate 0.5 mL/min. Solvent A: 0.1% TFA/Water; solvent B: 0.1% TFA/Acetonitrile. 2-62 min, solvent A, 100%-40%, solvent B, 0%-60%.

FIG. 1A shows a HPLC profile of whole fruit Luo Han Guo extract prepared according to the method described above. FIG. 1B shows a HPLC profile of other Luo Han Guo extract on the market. It is clear from these two profiles that the whole fruit extract of the present invention is different and distinct from other Luo Han Guo extracts in the art. The present invention prepares extract from the peel and pulp of Luo Han Guo fruits, whereas other Luo Han Guo extracts are focused on the sweeteners of terpene glycoside from Luo Han Guo, such as mogroside IV, mogroside V, 11-o-mogroside V and siamenosidi mixture. For example, there are Luo Han Guo extracts on the market that contain 80% or more mogroside derived from dried and fresh Luo Han Guo fruit (Hunan Nature Pharmaceutical Co., Ltd., China).

EXAMPLE 2

Formulation of Luo Han Guo Extract Syrup

In one embodiment, the whole fruit extract from Luo Han Guo prepared according to the processes described above can be formulated into syrup. For example, a Luo Han Guo syrup can be formulated as comprising the whole fruit extract of the present invention and sugar alcohols (polyols). One of ordinary skill in the art would readily use the extract of the present invention and commonly used sugar alcohols to formulate a Luo Han Guo syrup.

Sugar alcohols are neither sugars nor alcohols. They are carbohydrates with a chemical structure that partially resembles sugar and partially resembles alcohol, but they don't contain ethanol as alcoholic beverages do. They are incompletely absorbed and metabolized by the body, and consequently contribute fewer calories. The commonly used sugar alcohols include sorbitol, mannitol, xylitol, maltitol, maltitol syrup, lactitol, erythritol, isomalt and hydrogenated starch hydrolysates. Their calorie content ranges from 1.5 to 3 calories per gram compared to 4 calories per gram for sucrose or other sugars. Most are approximately half as sweet as sucrose; maltitol and xylitol are about as sweet as sucrose.

In addition to adding a sweet taste, polyols perform a variety of functions such as adding bulk and texture, providing a cooling effect or taste, inhibiting browning that occurs during heating and retaining moisture in foods. Manufacturers frequently use sugar alcohols in combination, as well as with other sweeteners to attain a desired taste and sweetness level. The commonly used polyols are regulated by the Food and Drug Administration as either GRAS (Generally Recognized As Safe) or approved as food additives.

It is an object of the present invention to use Luo Han Guo whole fruit extract to make a sugar-free, low calorie, low glycemic index syrup. Sugar is found in all kinds of fruits. The percentage of sugar in a specific fruit depends on the weather, climate, etc., of the region it is originated/cultivated in. To make a sugar-free and low calorie syrup, the sugar level of Luo Han Guo extract is measured. Then depending on the percentage of sugar in the Luo Han Guo liquid extract, suitable amount of a sugar alcohol such as maltitol is added to create a mixture of 60 Brix degrees or more. For example, it is desirable that the Luo Han Guo syrup achieves a Brix degrees≧65%, pH 4-6. The sugar content of the extract is adjusted to less than 0.5 g per serving. Sugar content of less than 0.5 g per serving must be achieved in order to label the product as "sugar-free".

Alternatively, no sugar added syrup can be formulated by mixing the Luo Han Guo extract with a sugar alcohol such as maltitol at different ratios. The mixing ratio is determined according to the preference for sweetness or the concentration of the Luo Han Guo extract. In one embodiment, syrup can be formulated by mixing the Luo Han Guo extract and a sugar alcohol at a 3:7 ratio, e.g. mixing 30 liters of Luo Han Guo extract with 70 liters of 75% maltitol.

In view of the disclosure provided herein, one of ordinary skill in the art would be able to formulate the fruit syrup by mixing the Luo Han Guo extract with a sugar alcohol, additives, and water in any desirable ratios. The resulting Luo Han Guo fruit syrup can be used as sweetener in all sorts of situation, e.g. uses as breakfast syrup, sweetener for coffee or tea, and baking/cooking purposes.

EXAMPLE 3

Formulation of Luo Han Guo Extract Jam

In another embodiment, the whole fruit extract from Luo Han Guo prepared according to the processes described above can be formulated into jam. For example, a Luo Han Guo fruit jam can be formulated as comprising the whole fruit extract of the present invention, sugar alcohol, calcium citrate, citric acid, and pectin. One of ordinary skill in the art would readily formulate the extract of the present invention into a Luo Han Guo fruit jam using standard techniques.

What is claimed is:

1. A method of preparing whole fruit extract from Luo Han Guo fruits, comprising:
   a. cleaning the fruits;
   b. breaking the outer shell of the fruits;
   c. boiling the fruits including the shell in water, thereby obtaining an extracted liquid containing solid components of the fruits, wherein the extracted liquid contains extracts of the shell and pulp of the fruits; and
   d. separating the solid components of the fruits from the extracted liquid.

2. The method of claim 1, wherein the Luo Han Guo fruits are boiled for about 1 to 2 hours.

3. The method of claim 1, wherein the extracted liquid containing solid components of the fruits is further acidified to about pH 4.0-5.0 with an edible acid.

4. The method of claim 3, wherein the acidified extract is further treated with pectinase to remove pectin.

5. The method of claim 4, wherein the pectinase is denatured by heating after treating the acidified extract.

6. The method of claim 1, wherein the extracted liquid without the solid components of the fruits is further concentrated.

* * * * *